United States Patent [19]

Domagala

[11] Patent Number: 5,598,440
[45] Date of Patent: Jan. 28, 1997

[54] DDS DRIVEN DDS SYNTHESIZER FOR GENERATING SINEWAVE WAVEFORMS WITH REDUCED SPURIOUS SIGNAL LEVELS

[75] Inventor: Jerzy Domagala, Dollard des Ormeaux, Canada

[73] Assignee: MPB Technologies Inc., Claire, Canada

[21] Appl. No.: 336,183

[22] Filed: Nov. 8, 1994

[51] Int. Cl.⁶ .................................................. H03L 7/18
[52] U.S. Cl. ........................... 375/329; 375/334; 327/105; 364/721
[58] Field of Search ..................... 375/272, 279, 375/303, 308, 329, 334, 377; 331/18–19; 455/76, 183.1, 260; 327/100, 105–107; 364/721

[56] References Cited

U.S. PATENT DOCUMENTS

| | | | |
|---|---|---|---|
| 4,815,018 | 3/1989 | Reinhardt | 364/701 |
| 4,951,237 | 11/1990 | Essenwanger | 364/721 |
| 4,965,533 | 10/1990 | Gilmore | 331/18 |
| 5,028,887 | 7/1991 | Gilmore | 331/18 |
| 5,128,623 | 7/1992 | Gilmore | 327/107 |
| 5,175,511 | 12/1992 | Fujiwara | 331/18 |
| 5,184,093 | 2/1993 | Itoh et al. | 327/107 |
| 5,382,913 | 1/1995 | Carson et al. | 327/105 |

OTHER PUBLICATIONS

M. P. Wilson, T. C. Tozer;; Spurious Reduction Techniques for Direct Digital Synthesis, IEE Colloq. on "DDFS", 19 Nov. 1991, IEE Digest 1991/ 172 pp. 1–5.
J. Fobbester, "Spur reduction in direct digital synthesis"; Electronic Product Design, Jun. 1992, pp. 23–24.

Primary Examiner—Young T. Tse

[57] ABSTRACT

ADDS driven DDS Synthesizer (DDS² Synthesizer) is disclosed, wherein the first DDS—a Reference DDS—generates a high resolution tunable output signal, which is in turn expanded and/or upconverted to the frequency bandwidth and range required by the clock of the second DDS—a DDS Divider. The DDS Divider acts as a programmable "sinewave divider" of its tunable input clock by division ratios "n" limited to the set of small integer numbers 3; 4; 5; 6 . . . , chosen to eliminate phase truncation spurs and limit quantization spurs to harmonics of the fundamental output and thus to provide a high spectral purity, high resolution, fast switching DDS based synthesizer.

6 Claims, 4 Drawing Sheets

DDS DRIVEN DDS SYNTHESIZER FOR GENERATING SINEWAVE WAVEFORMS WITH REDUCED SPURIOUS SIGNAL LEVELS

BACKGROUND OF THE INVENTION

1. Field of Invention

The present invention relates to Direct Digital Frequency Synthesizers (DDS), and more particularly to a DDS based synthesizer architecture allowing, at low price and low complexity, for substantially reduced output spurious level without trading-off the DDS advantages of high frequency resolution and fast settling time.

2. Description of the Related Art

Direct Digital Frequency Synthesis is a digital technique of frequency synthesis providing the advantages of digital control of frequency and phase, high frequency resolution and fast settling time while maintaining a phase coherent output and small size due to monolithic fabrication techniques. However, this technique, in its present form, exhibits relatively poor output spectral quality, mainly evidenced by the presence of numerous spurious signals (commonly referred to as "spurs").

An apparatus employing this technique is referred to as a Direct Digital Synthesizer (DDS). It includes three principal blocks: Accumulator, Look Up Table (LUT) ROM and Digital to Analog Converter (DAC). Depending on the implementation a DDS based Synthesizer may use one, two or three monolithic chips. In most cases the two chips solution is used: one chip consisting of an Accumulator and a LUT ROM (usually called DDS) provides digital samples of the synthesized waveform and a second chip—DAC converts the digital samples to an analog form.

A DDS accumulator converts frequency setting data into phase samples which in turn determine the magnitude of a synthesized output waveform at a given sample time. Consecutive phase samples address a LUT which transforms each phase sample into a digital amplitude sample of a desired (usually sine wave) signal. Digital amplitude samples are converted to an analog form by a DAC and then filtered by an output filter. The spectral purity of the DDS synthesizer is mainly determined by the following elements: (a) truncation of the phase accumulator output applied to the LUT; (b) DAC's resolution; (c) DAC's dynamic performance and (d) alias images. Furthermore, the spectral purity of the synthesized output signal depends on: (e) jitter level of a reference clock and ratio of the synthesized output frequency to the reference clock frequency; (f) DAC's linearity and (g) noise floor of the DDS digital circuitry.

The resulting spurious signals are more or less "randomly" distributed throughout the output frequency range and cannot be removed by filtering.

Spurs due to the phase truncation

The accumulator is a N-bit digital phase integrator. The input frequency word determines the phase step size by which the accumulator is incremented, its output sum represents an instantaneous phase of the synthesized signal (sinewave). The rate of overflow of the accumulator determines an output frequency.

Most integrated solutions for DDS provide an accumulator with typically N=32 bits of resolution, and provision to increase resolution by cascading them. However, the phase-to-sine conversion circuit (Look Up Table), being optimized for cost and power, usually takes only the M most significant bits of the phase accumulator output. This phase truncation introducers jitter in an output waveform, which is observed as spurious Phase Modulation (PM) components. The level of the worst case spur signal due to the phase truncation is equal to:

$$S_{PM} = -6 \cdot M [dBc].$$

Quantization Noise

Amplitude quantization also causes spurious responses. As a quantized DDS output waveform is deterministic and periodic, the quantization errors are correlated to the output and not random but rather periodic. As a result, the quantization noise power is not equally spread over the Nyquist bandwidth but concentrated in few discrete Amplitude Modulation (AM) components. These strongly limit the theoretical DAC's Spurs Free Dynamic Range (SFDR). Three limiting cases of the quantization spurs may be considered: (a) there is no close-in common multiple between the DDS clock frequency and the output frequency. In this case the quantization errors have very long period and broad, quite uniformly distributed spectrum, being similar to the white noise floor. In reality, this "noise floor" is rather a "sea" of discrete AM spurious components of relatively similar amplitudes; (b) there is a close-in common multiple between a DDS clock frequency and an output frequency. In this case a quantization "noise" energy is concentrated in several discrete AM spurs due to the highly periodic nature of the error process. Their frequency locations, fixed for a given $f_{Clk}/f_{out}$ ratio, will change as the $f_{out}$ changes, resulting in a random-like spurs pattern at the output; (c) the DDS clock frequency is an integer multiple of the output frequency:

$$f_{out} = \frac{1}{n} \cdot f_{Clk}$$

where n=3, 4, 5, 6, . . . . In this case, quantization error AM spurs are harmonically related to the output frequency appearing as its $2^{nd}$, $3^{rd}$, $4^{th}$, . . . etc. harmonics. As a result a "close-in" band (octave) is spurs free.

DAC Time Domain Performance

The DAC's dynamic performance during input code-to code transitions is also a factor determining the DDS output spectral purity (Analog Devices AN-273: "Choosing DACs for Direct Digital Synthesis" by D. Buchanan). The slew rate, output stage balance, glitch pulse, settling time and clock & data feedthroughs, particularly at high sampling rates are the sources of unwanted energy (spurs & noise) spread over the output bandwidth. In general, less samples per period of a synthesized output signal, results in less unwanted energy spread over the output bandwidth and higher output spectral purity.

Spurious due to the Clock

A DDS synthesizer acts as a clock divider with division ratio equal to:

$$n = \frac{f_{Clk}}{f_{out}} = \frac{2^N}{P}$$

where:

$$P = \sum_{i=0}^{N-2} a_i \cdot 2^i$$

is a selected phase step and $a_i$ is the $i^{th}$ coefficient of the frequency setting word taking value of 0 or 1.

As a result, the input clock jitter (discrete spurious sidelobes and noise) is attenuated by 20 log(n). Practically, the DDS output frequency is limited to ⅓ of the clock frequency, to avoid aliasing, so the jitter content of the synthesized output signal is improved by at least 9.5 dB compared to that of the input clock. The lower the output frequency, the higher is the division ratio "n" and the higher the input clock jitter attenuation.

Alias Images

The sampling process modifies the spectrum of the original synthesized signal X(f) by introducing weighted alias images, according to the following equation $$x(t) \cdot \sum_i d_\epsilon (t - i\Delta t) \Leftrightarrow \hat{X}(f) = \sum_k X(f - k \cdot f_s) \cdot \frac{\sin \Pi k \epsilon f_s}{\Pi k \epsilon f_s}$$

$$f_s = \frac{1}{\Delta t}$$

is a sampling frequency, $d_\epsilon(t)=1/\epsilon$ for $|t| \leq \epsilon$ and 0 elsewhere is the idealized sampling pulse and $\hat{X}(f)$ is the spectrum of the sampled signal.

The sampling process has several consequences: (a) as the output frequency $f_{out}$ increases, the frequency of the $1^{st}$ alias image equal to $f_{Clk}-f_{out}$ decreases. This limits the practically achievable maximum $f_{out}$ to approximately ⅓ of $f_{Clk}$ due to the limited sharpness of the filters. Much more critical than the $1^{st}$ alias image (which may be filtered out) is the harmonic distortion of the synthesized output. The harmonics are usually the predominant source of spurs. They can be easily filtered out in any analog system using octave filters. However in the sampled system, the harmonic images (and their PM spurs) move in the opposite direction to the fundamental output, so they cross over and share the same bandwidth and, therefore, they cannot be removed by filtering; (b) the alias images ($1^{st}$, $2^{nd}$ . . . etc.) may be considered as the naturally (due to the sampling) upconverted outputs and used after appropriate bandpass filtering. However, in general their spurs free dynamic range is lower than that of the fundamental component. That is why under normal circumstances, fundamental output images cannot be used as the "clean" signal source.

Existing Reduced Spurs DDS Solutions

The described sources of spurious signals are inevitably related to the digital synthesis technique and more particularly to technological limits such as: (a) LUT dimensions (capacity of the fast access memory & its DC power requirement); (b) DAC's effective resolution, dynamic performance & linearity and (c) Sampling process (cross-over alias images generation).

The existing solutions in general consist in randomization of PM and/or AM spurs spectrum. The Essenwanger method, as described in U.S. Pat. No 4,951,237 "Direct Digital Synthesizer with Selectably Randomized Accumulator" randomizes the DDS accumulator overflow by dithering the accumulator's bits. The randomizer adds random or pseudorandom values to a selectable few of the least significant bits of the accumulator to introduce flat or nearly flat frequency deviation density in the vicinity of significant spurs for spurious frequency suppression. This frequency deviation density at the spurs offset from the carrier spreads the energy of the spurs, therefore reducing their level.

The Wilson technique ("Spurious Reduction Techniques for Direct Digital Synthesis"; M. P. Wilson and T. C. Tozer, IEE Digest 1991/172, IEE Colloquium on "Direct Digital Frequency Synthesis", 19 Nov. 1991), for which a patent has been applied, consists in DAC transfer function decorrelation. Pseudo-random numbers are added or subtracted to the LUT output by means of the ALU placed at the digital port of the DAC. By the analogue subtraction of a compensating signal from a second DAC, the output signal is restored to the correct level. As the DAC dithering is random, quantization errors will therefore not correlate between cycles, leading to "noise-like" corresponding AM spurs.

The above mentioned techniques have the following limitations: (a) the improvement of the spectral purity is substantial only for DDSs using the low resolution DACs (practically no more than 8 bits); there is no noticeable improvement with 10 bits DACs (Qualcomm Q2334 with patented Noise Reduction Circuit as an example); (b) the level of spurs is reduced at low sample rates and increases at higher sample rates, so the very important upper range of the DDS Synthesizer output bandwidth is still significantly affected by spurs; (c) if dither is introduced it increases the output phase noise floor; (d) the required hardware is complex, especially for high frequency DDS synthesizers; (e) "in-band" crossover spurs (harmonics alias images) are still a predominant factor limiting the output spectral purity. The Fobbester method ("Spur Reduction in Direct Digital Synthesis" I. Fobbester, Electronic Product Design, June 1992 pp.23–24) uses a "mix-and-divide" technique. The output of the Plessey SP2002 DDS is subsequently upconverted, divided by fixed modulus divider (SP8804 divider by 4) and band-pass filtered. Spurs level reduction is a result of the division process (PM spurs reduced by 20log (Division Ratio), and the hardlimiting process (AM spurs). The Fobbester technique provides a synthesizer system with very limited output bandwidth (in the mentioned system only 2 MHz). This is due to (a) very high level of harmonics produced by FF-based dividers and practically achievable Band Pass Filter (BPF) suppression; (b) limited number of "usable" division ratios generating the 50% duty cycle output signal required to reduce the second harmonic content; c) complex hardware.

OBJECT OF THE INVENTION

An object of the present invention is to provide a DDS based frequency synthesizer generating an output sinewave with reduced level of spurs.

Another object of the invention is to provide a frequency synthesizer having fast settling time and high frequency resolution, similar to those of the existing DDS based synthesizers.

Another object of the present invention is to provide a frequency synthesizer of relatively low hardware complexity.

SUMMARY OF THE INVENTION

According to the present invention, there is provided a Direct Digital Synthesizer (DDS) driven DDS Synthesizer ($DDS^2$ Synthesizer) for generating an output signal of a digitally programmed frequency including:

first DDS—a Reference DDS, having a fixed input clock frequency and generating an output signal of a frequency corresponding to a digitally programmed Reference Frequency Control Word;

second DDS—a DDS Divider, having a tunable input clock frequency and generating an output signal of a frequency corresponding to the ratio of its input clock to a division factor (divisor) "n" digitally programmed by a Division Ratio Control Word.

Bandwidth Expander and Frequency Translator to generate the necessary bandwidth from the Reference DDS output signal and to shift it to the frequency range required by the input clock of the DDS Divider.

Clock Interface Unit to reshape the filtered output signal from the Bandwidth Expander and Frequency Translator to the form required by the DDS Divider input clock circuitry;

Trigger Timing Unit to control the programming process of the $DDS^2$ synthesizer in order to optimize its switching time.

The objects, advantages and other features of the present invention will become more apparent upon reading of the following non restrictive description of a preferred embodiment thereof, given for the purpose of exemplification only with reference to the accompanying drawings.

According to the invention, a double DDS system is used. The first DDS unit, a Reference DDS (including a DDS and a DAC) is working in the traditional Direct Digital Synthesizer configuration and generates a high frequency resolution output signal, according to the input Reference Frequency Control Word. Its spectral purity is limited by all previously discussed sources of spurious signals, mainly: phase truncation PM spurs, quantization AM spurs and alias images.

Assuming the simplest implementation of the $DDS^2$ synthesizer (the DDS Reference output bandwidth covers the required DDS Divider input clock bandwidth so there is no need for bandwidth enlargement), the appropriate fraction of the Reference DDS output bandwidth is lowpass filtered and then translated to the frequency range required by the input clock of the second DDS unit—DDS Divider. The DDS Divider (including a DDS and a DAC) acts as a "sinewave divider" of its input clock. The set of usable division ratios of the DDS Divider is restricted to carefully chosen divisors "n" according to the following rules: (a) $n \leq 2^N/\Delta\phi_{min}$ where N is the length of the DDS Divider accumulator and $\Delta\phi_{min}$ is the minimum value of the programmed phase step required to avoid the phase truncation process and so PM spurs generation. Theoretically, for a M-bits LUT, the division ratio "n" must be $\leq 2^M$. Practically, it depends on the internal DDS architecture, because usually DDSs use only quarter wave sine/cosine LUT and additional 2-bits Full Wave Logic, increasing the LUT resolution. For simplicity, throughout this document M will be understood as the effective LUT length corresponding to phase truncation spurs free range of operation of the DDS; (b) the $f_{Clk}/f_{out}$ rate should be an integer number, for example 3, 4, 5 etc. . . . to limit generation of AM spurs (due to quantization effects) to harmonics of the fundamental output, as well as to control positions of alias image components. The requirement (b) may be relaxed to include a few fractional numbers such as for example, 3.5, 4.5, . . . etc, at the price of generation of some sub-harmonics of the fundamental output and a narrower spurs free output bandwidth. However, as the spectral positions of sub-harmonics and their alias images are known a priori (for example $1^{st}$ sub-harmonic will be at $f_{out}/2$), they can be taken into account in a frequency plan and removed by filtering.

The invention departs significantly from all prior approaches. Instead of using the "squarewave" Flip-Flop dividers, a DDS is used as a programmable "sinewave divider" scaling down its input clock frequency by any $n \geq 3$, including some fractional division ratios. As long as all N-M least significant bits of its phase accumulator are not involved in the process of synthesis of an output frequency, the output signal is free of phase truncation spurs. The main advantages of this solution are: (a) division ratio may be any $n \geq 3$ including some carefully chosen fractional numbers providing the corresponding phase step is bigger than $\Delta\phi_{min}$. This drastically minimizes required bandwidth of the DDS Divider input clock; (b) harmonics level is relatively very low compared to the Flip-Flop based dividers (practically −40 to −60 dBc) which makes it much easier to filter them out to the required spectral purity level and at the same time allows for much larger available output bandwidth; (c) AM quantization spurs occur only at known harmonic frequencies, providing an octave spurs free bandwidth, (fractional division ratios will generate sub-harmonic and its alias images, limiting the spurs free output bandwidth); (d) there are no cross over alias image harmonics in the output spectrum; (e) the number of samples per period of the synthesized sinewave may be kept close to the Nyquist limit (for example instead of 8 samples for division ratio n=8, only every second sample is processed by a DAC). Although the sampling clock and the $1^{st}$ alias image will be closer to the fundamental output frequency, the level of the DAC's error energy spread over the output bandwidth will be lower.

For instance in an AD9955 based $DDS^2$ Synthesizer system, the level of Reference DDS phase truncation spurs is approximately equal to −72 dBc (−6.12). That means they will appear at the DDS Divider output at no more than −82 dBc level (attenuation of at least 20log3). The level of Reference DDS quantization AM spurs is typically −60/−65 dBc. These spurs are practically entirely removed by the DDS Divider Clock Interface circuitry (usually a digital TTL or ECL system re-shaping an input sinewave to the waveform required by the DDS Divider input clock circuitry) and by an internal DDS Divider clock path circuitry—both acting as hardlimiters. Taking into account an easily achievable 20 dB of AM to PM conversion loss due to the hardlimiting process and a DDS Divider attenuation by 20log(n), these spurs will appear at the DDS Divider output attenuated to −90/−95 dBc.

The DDS Divider itself, in its "sinewave divider" configuration, is not generating either phase truncation PM spurs (due to the limited set of division ratios "n") or "random-like" quantization spurs. For integer division ratios "n", its quantization spurs are strictly harmonically related and occur at $2f_{out}$, $3f_{out}$ . . . frequencies. Furthermore, spectral positions of all alias images (and their harmonics) correspond exactly to the locations of the main output signal $f_{out}$ and its harmonics, so there are no "cross-over" spurs. As the result, the spectral purity of the AD9955 based $DDS^2$ system is of order of −82 dBc over the entire output bandwidth—a result not achievable with any traditional DDS system.

Table 1 shows an example of the frequency plan of an AD9955/AD9721 DDS/DAC chip set based $DDS^2$ synthesizer.

TABLE 1

| Division ratio "n" | DDS Divider $f_{CLK\_DIV}$ range [MHz] | $DDS^2$Synthesizer $f_{Out}$ range [MHz] |
| --- | --- | --- |
| 3 | 75.0–90.0 | 25–30 |
|   | (67.5–90) | (22.5–30) |
| 3.5 | 78.75–87.5 | 22.5–25 |
| 4 | 76–90 | 19–22.5 |
|   | (72–90) | (18–22.5) |
| 4.5 | 81–85.5 | 18–19 |
| 5 | 75–90 | 15–18 |
| 6 | 77.1–90 | 12.85–15 |
| 7 | 78.75–89.95 | 11.25–12.85 |
| 8 | 80–90 | 10–11.25 |
| 9 | 81–90 | 9–10 |
| 10 | 84–90 | 8.4–9 |
| 11 | — | — |

The figures in parentheses are the DDS Divider input clock spans required to avoid the use of the fractional division ratios of 3.5 and 4.5 which would result in generation of sub-harmonic $f_{out}/2$ and its alias images spurs.

A low level of AM spurs in $DDS^2$ synthesizer configuration is particularly advantageous, because they are usually the most difficult spurious components to eliminate, specifically in wide band high frequency DDS based synthesizers.

An additional advantage of the invention is the enhanced frequency resolution of the $DDS^2$ synthesizer output signal, equal to $\Delta f_{out}=\Delta f_{ref\_DDS}/n$, which is always better than that provided by the traditional configuration of Reference DDS, $\Delta f_{REF\_DDS}$.

In addition, the alias image components of the $DDS^2$ synthesizer are very clean across a large spectral band. For example the $1^{st}$ image of the DDS Divider fundamental output synthesized at the division ratio n=3, will provide a spectral purity close to that of the Reference DDS output, improved by $20\log[f_{Clk}/(f_{Clk}-f_{out})]=20\log(f_{clock}/f_{1st\ image})$, which, in the case of n=3, gives ≈3.5 dB. Similarly, the spectral purity of the $2^{nd}$ image component will be about 2.5 dB worse than that of the Reference DDS output (amplified by $20\log[(f_{Clk}+f_{out})/f_{Clk}]$). These results are far better than those using traditional DDS architectures.

The Clock Interface Unit reshapes the frequency translated (upconverted) Reference DDS signal (usually sinewave) to the form (amplitude, offset, rise & fall times, duty cycle) required by the DDS Divider.

A high frequency $DDS^2$ Synthesizer may be built using a low cost low frequency Reference DDS and a high frequency DDS Divider. However, a bandwidth expander (for example a multiplier) may be necessary to cover the bandwidth required by the DDS Divider input clock according to a given $DDS^2$ synthesizer frequency plan. Although the multiplication process increases the level of PM spurs, the spectral purity of the $DDS^2$ synthesizer will be better compared to the existing traditional DDS configurations. This is due to the much better spectral purity of low frequency DDSs, to the DDS Divider division process and to the absence of AM "random-like" quantization spurs limiting the SFDR of existing high frequency DACs. Traditionally DDS based synthesizers offer very fast switching time, basically determined by the internal data pipelining and external filters. The switching process as seen at the synthesizer output, consists of a "static" part, when due to the system delays the frequency of the output signal is still equal to the initial frequency setting, and the "dynamic" part, when the synthesizer output leaves the ±x[Hz] error band around its initial frequency and settles within the ±x[Hz] error band around its final frequency. The "static" part of the switching time in both traditional DDS and $DDS^2$ systems is similar and can be compensated for by simply triggering synthesizers in advance compared to the required hop time. The "dynamic" part (Transition Settling Time) depends on the synthesizer filters: narrowband, sharp filters will result in long transition settling process, while effect of wideband filters will be relatively marginal. The $DDS^2$ synthesizer, due to its dual DDS architecture, may require a Trigger Timing Unit (TTU) to optimize the transition settling process, especially, when narrowband filters are used and/or when a low frequency Reference DDS is used to drive a high frequency DDS Divider. In such case, due to the higher clock rate, the pipelining delay of the DDS Divider will be much shorter than that of the Reference DDS. The TFU enables the programming process of the $DDS^2$ synthesizer by selectively triggering the Reference DDS and DDS Divider in a pre-programmed sequence. Either hardware solutions—for example an appropriate fixed Delay Line calculated for a fixed Reference DDS clock rate, an average DDS Divider clock rate and average filter(s) group delay(s), or a programmable Delay Line adjusted to the current DDS Divider clock rate and the filter(s) group delay(s), or software solutions are possible. A properly designed TIU can provide a $DDS^2$ synthesizer with "dynamic" Transition Settling Time approximately twice that of the traditional DDS synthesizer.

The present invention significantly departs from any existing solution. Compared to the dither based DDS spurs reduction methods, the $DDS^2$ Synthesizer does not require any specialized hardware and uses commercially available DDSs. It does not increase the output noise floor, it considerably reduces PM spurious signals and practically eliminates "random-like" AM spurs over the entire DDS output bandwidth. Compared to the narrow-band FF-based Hybrid Direct Analog Synthesizer (DAS)/DDS Synthesizers, the $DDS^2$ Synthesizer provides a full (DC-to ⅓ $f_{Clk}$) crossover spurs free output bandwidth without rigorous BPFs stop-band specification requirements.

DETAILED DESCRIPTION OF PREFERRED EMBODIMENTS

Figure 1:
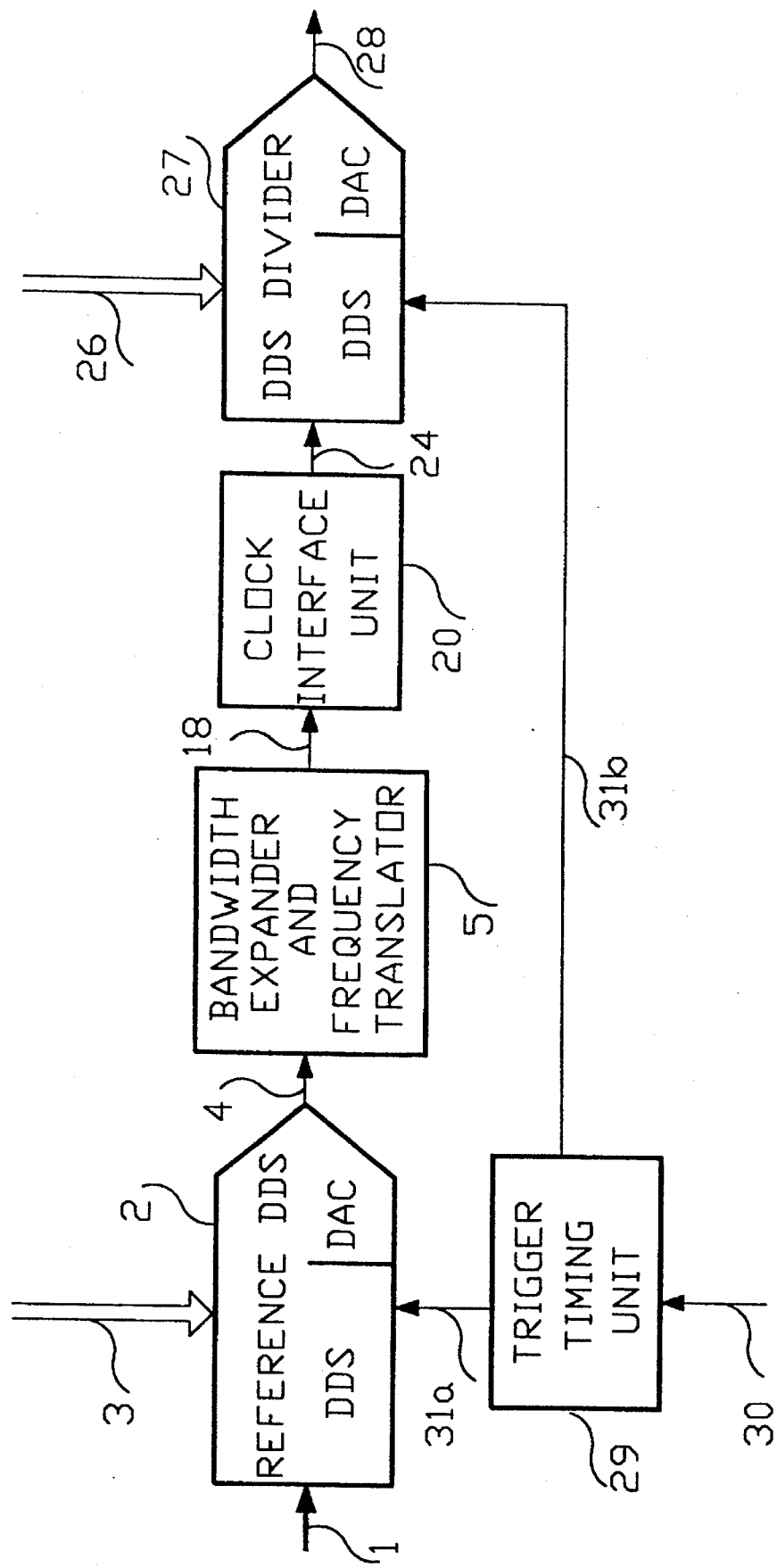
FIG. 1 is a block diagram illustrating the preferred embodiment of the invention.

An example of a $DDS^2$ Synthesizer system according to the preferred embodiment is shown in FIG. 1. The Reference DDS 2 receives a fixed frequency clock $f_{Clk\_REF}1$ and according to the Reference Frequency Control Word (RFCW) 3 generates an output sinewave $f_{REFOUT}4$ programmable over the DC-to- ≈⅓ $f_{Clk\_REF}$ bandwidth. Its frequency resolution is equal to $f_{Cl\_REF}/2^N$ where N is the length of the Reference DDS accumulator. The spectral purity of the output $f_{REF\_OUT}4$ is determined by PM spurs due to the LUT phase truncation and AM spurs due to the quantization errors, DAC's linearity and dynamic performance. The $f_{REF\_OUT}4$ output is supplied as an input to a Bandwidth Expander and Frequency Translator 5, The Bandwidth Expander and Frequency Translator 5 enlarges and translates the available bandwidth of the Reference DDS output signal $f_{REF\_OUT}4$ to a bandwidth and frequency range required by an input clock of the DDS Divider 27 according to a $DDS^2$ synthesizer frequency plan.

Figure 2:
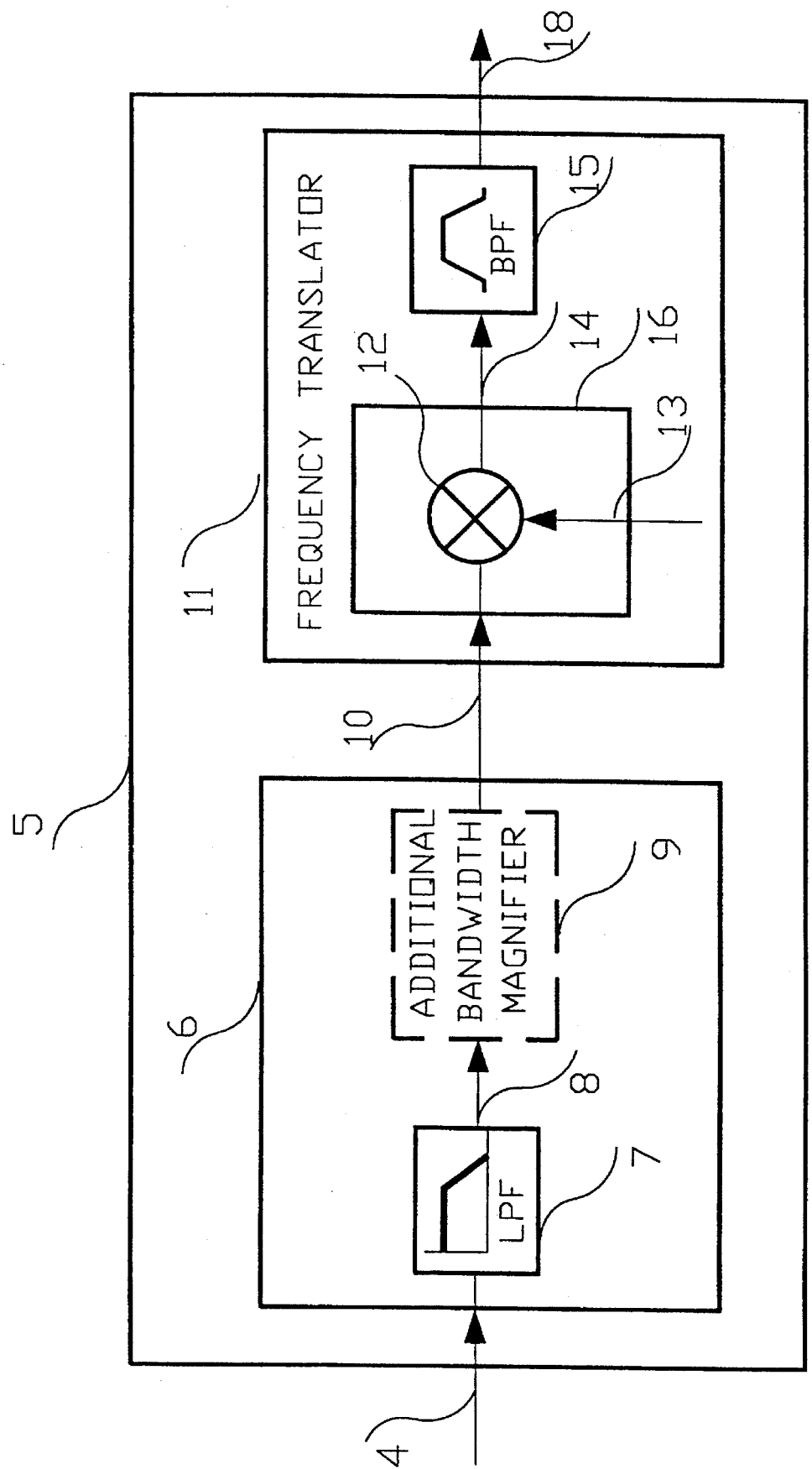
FIG. 2 is a block diagram of the Bandwidth Expander and Frequency Translator.

The generic embodiment of the Bandwidth Expander 6 and Frequency Translator 11 is shown on FIG. 2. An input lowpass filter (LPF) 7 enhances the spectral purity of the Reference DDS output signal $f_{REF\_OUT}4$ by removing unwanted spectral components (i.e. fundamental output harmonics, $f_{Clk\_REF}$ feedthrough, out of band spurs & alias images). It provides the output signal $f_{REF\_LPF}$ an input of optional bandwidth magnifier 9. Should bandwidth magnifier 9 not be used, the LPF 7 output signal $f_{REF\_LPF}$ 8 is provided as an input to a frequency translator 11. This is when the bandwidth of the Reference DDS output signal $f_{REF\_OUT}$ 4 meets the bandwidth requirements of the input clock of the DDS Divider 27, so there is no need for bandwidth enlargement. In this case the Bandwidth Expander consists only of the LPF 7. However, when the bandwidth provided by the Reference DDS output signal $f_{REF\_OUT}$ 4 is narrower than that required by the input clock of the DDS Divider 27 according to a given frequency plan of the DDS$^2$ synthesizer, the output signal $f_{REF\_LPF}$ 8 is supplied to the input of the optional bandwidth magnifier. The bandwidth magnifier 9 may be constructed in many different forms. One simple form is that of a multiplier, for example a doubler and a bandpass filter or a series of doublers and bandpass filters. Another more complex form is that using a "mix-and-add" architecture consisting of mixer(s), bandpass filters and RF switches selecting the appropriate output. The bandwidth magnifier 9 provides the output signal of enlarged bandwidth $f_{REF\_EXP}$ 10 to the input of the frequency translator 11. The frequency translator 11 translates the frequency of its input signal to a frequency range required by the input clock of the DDS Divider 27. The preferred embodiment of the frequency translator 11 comprises an upconverter 16 consisting of mixer 12 and local oscillator (LO) 13, and a bandpass filter 15. The output signal from the bandwidth expander 6 is connected to the input port of the mixer 12. The mixer 12 translates its input signal to the output signal $f_{CLK\_UCV}$ 14 using an LO 13 of an appropriate frequency. The output signal $f_{CLK\_UCV}$ 14 from the mixer 12 is supplied to the input of the bandpass filter (BPF) 15. The BPF 15 removes the $f_{LO}$ feedthrough, an unwanted upconversion sideband and all remaining out of band intermodulation products and outputs a filtered signal $f_{CLK\_TRS}$ 18 connected to an input of the Clock Interface Unit (CIU) 20.

Usually the bandwidth enlargement process at the same time translates the initial frequency of an input signal to a higher frequency range, so in spite of distinctive tasks to be accomplished by the bandwidth expander 6 and the frequency translator 11, they may be implemented as a one unit: Bandwidth Expander & Frequency Translator 5.

Figure 3:
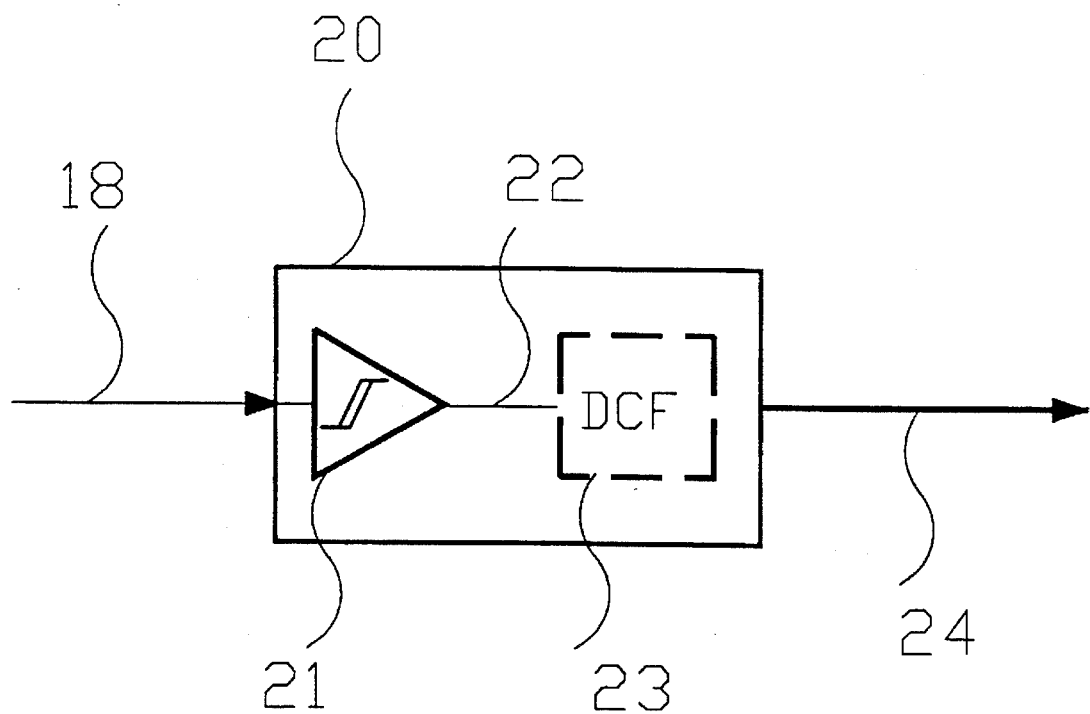
FIG. 3 is a block diagram of the Clock Interface Unit.
Figure 4:
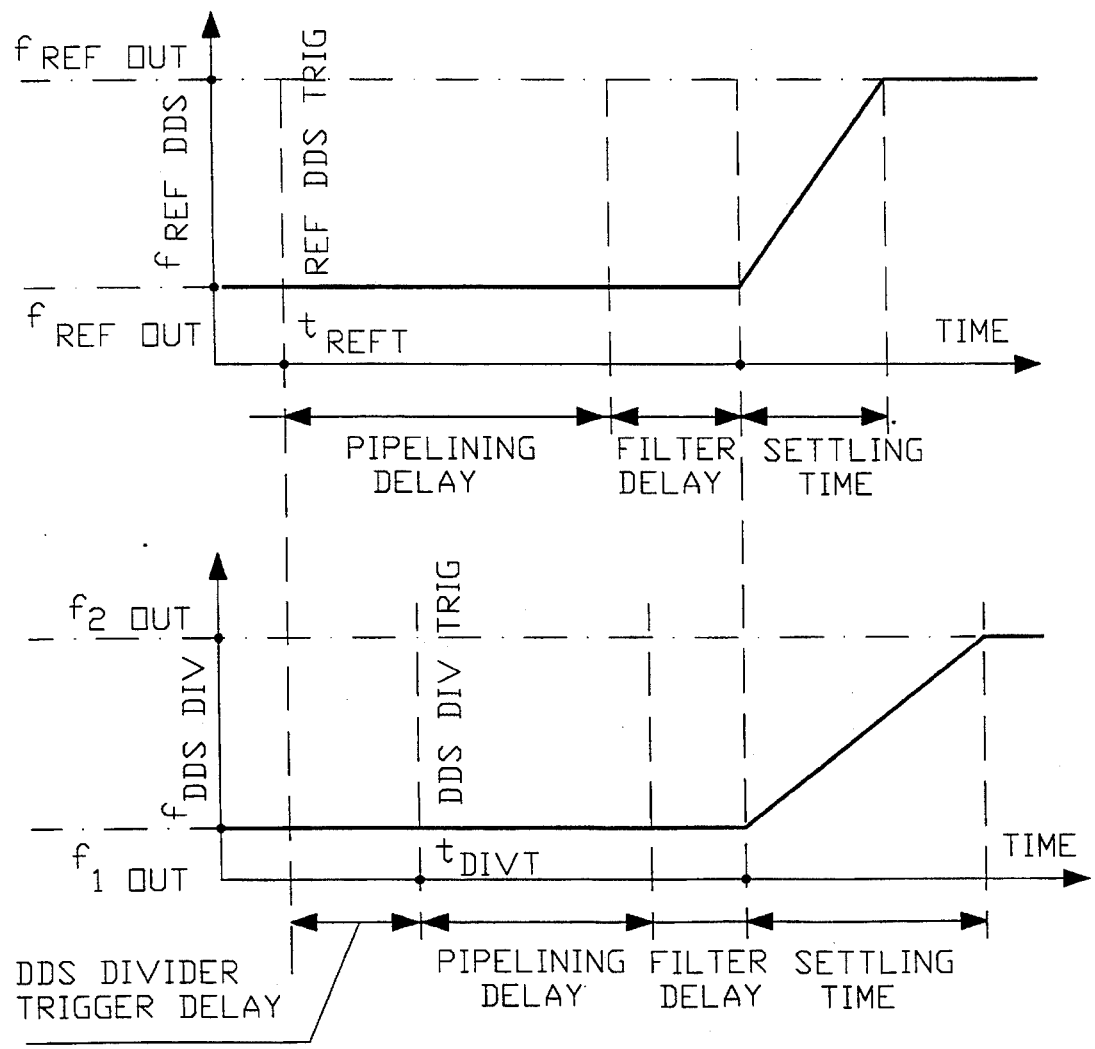
FIG. 4 illustrates the $DDS^2$ Synthesizer trigger timing sequence according to the preferred embodiment of the invention.

The Clock Interface Unit 20 reshapes an input signal 18 to the form of $f_{CLK\_DIV}$ 24 (amplitude, DC offset, raise & fall times and duty cycle) required by a given DDS Divider clock input(s). The preferred embodiment of the Clock Interface Unit 20 is shown in FIG. 3. The CIU 20 consists of a comparator 21 producing an approximately 50% duty cycle square-wave 22 of frequency corresponding to the $f_{CLK\_TRS}$ 18. An optional Duty Cycle Formatter (DCF) 23 modifies the duty cycle if other than 50% is required providing the required signal to the clock input(s) of the DDS Divider 27. Should Duty Cycle Formatter 23 not be used, the output of comparator 21 is connected to the clock input(s) of the DDS Divider 27.

The DDS Divider 27 acts as the "sinewave" divider. It synthesizes an output signal of frequency equal to $f_{CLK\_DIV}/n$. The division ratios "n" are programmed by the Division Ratio Control Word (DRCW) 26 and are restricted to the set of integer numbers 3, 4, 5, ... etc. or some carefully chosen fractional numbers as for example 3.5, 4.5, .... To avoid the generation of PM spurs, division ratios must satisfy the equation: $n \leq 2^N/\Delta\phi_{min}$ where N is the length of the DDS Divider accumulator and the $\Delta\phi_{min}$ is a minimum value of the programmed phase step required to avoid the phase truncation process (for simplicity, it can be assumed that $2<n<2^M$ where "M" is the effective size of DDS Divider LUT).

PM spurs of the DDS Divider input clock $f_{Clk-DIV}$ 24 due to the inevitable Reference DDS phase truncation will be attenuated by the DDS Divider 27 by 20log(n) (for example, 9.5 dB for division ratio "n" of 3; 12 dB for division ratio "n" of 4 etc.). AM spurs at an upconverted and bandpass filtered output of the Reference DDS $f_{CLK\_TRS}$ 18 (due to the quantization and DAC's nonlinentity) will be removed by the Clock Interface Unit 20 as well as by the DDS Divider 27 internal clock path circuitry—both acting as hardlimiters.

20 to 30 dB of AM spurs attenuation (AM-PM conversion loss and DDS Divider 20log(n) jitter attenuation) is easily achievable, so AM spurs of the Reference DDS 2 will occur at the DDS Divider output $f_{Out}$ 28 well below an acceptable spurs level. The DDS Divider itself in its "sinewave divider" configuration, is not generating "random-like" quantization spurs. For integer division ratios "n", its quantization spurs are strictly harmonically related and occur at $2 \times f_{Out}$, $3 \times f_{Out}$ ... $n \times f_{Out}$ frequencies. Furthermore, spectral positions of all alias images (and their harmonics) correspond exactly to the locations of the fundamental output signal $f_{Out}$ 28 and its harmonics. As a result, there are no "cross-over" spurs. Practically, this level of spectral purity is achievable over a whole usable bandwidth of a given DDS Divider chip-set (DDS and DAC). The DDS$^2$ output frequency $f_{Out}$ 28 is programmed by the Reference DDS Reference Frequency Control Word 3 and the DDS Divider Division Ratio Control Word 26.

A Trigger Timing Unit 29 is used to selectively enable the DDS$^2$ synthesizer programming process, by loading new data into synthesizer subassemblies at predetermined time intervals. The preferred embodiment of the Trigger Timing Unit 29 consists of tapped delay line receiving at the input a system hopping trigger 30 and providing at the outputs its delayed replicas 31a, 31b. The particular delayed replicas are supplied to the inputs enabling the programming process of correspondingly: Reference DDS 2 and DDS Divider 27. The individual delays between the delayed replicas of the input system hopping trigger 30 are adjusted in a way to compensate for unequal static parts of the DDS$^2$ synthesizer's subassemblies switching times.

The foregoing discussion has illustrated a DDS$^2$ Synthesizer providing an output sine wave with a reduced level of spurious components, high frequency resolution and fast switching time using relatively low complexity, commercially available hardware. As an example some achievable parameters provided by an AD9955/AD9721 based DDS$^2$ Synthesizer were presented. It is understood that the above-described embodiments are merely illustrative and many possible adaptations and variations of disclosed embodiments may be made using other DDSs/DACs integrated circuits without departing from the scope and spirit of the invention. Therefore, it is to be understood that, within the scope of the appended claims, the invention may be practiced otherwise than as specifically described.

What I claim is:

1. A reduced spurs level, high resolution and fast switching Direct Digital Synthesizer (DDS) driven DDS frequency synthesizer (DDS$^2$ synthesizer) for generation of a sinewave output signal of digitally programmed frequency, comprising:

a) a Reference DDS means including a DDS and a Digital to Analog Converter (DAC), having a fixed input clock frequency and generating an output signal of frequency digitally programmed by a reference frequency control word;

b) a DDS Divider means including a DDS and a DAC having an input clock signal of programmable frequency and generating said sinewave output signal of digitally programmed frequency by a division ratio control word;

c) bandwidth expander means to enlarge a bandwidth of the Reference DDS means output signal to an output signal of enlarged bandwidth required by said input clock signal of said DDS Divider means;

d) frequency translator means to shift said output signal of said enlarged bandwidth received from the bandwidth expander means to a frequency sited output signal of frequency range required by said input clock signal of said DDS Divider means;

e) reshaping means to reshape said frequency shifted output signal received from said frequency translator means to a form required by said input clock signal of said DDS Divider means; and f) Trigger Timing Unit means to enable the programming process of said $DDS^2$ synthesizer subassemblies.

2. The DDS driven DDS frequency synthesizer according to claim 1; wherein said bandwidth expander means disposed between said Reference DDS means and said frequency translator means includes:

a) input filter means for, receiving said output signal of said Reference DDS means, removing all unwanted spectral components from said output signal of said Reference DDS means and providing a filtered output signal to an additional bandwidth magnifier means;

b) said additional bandwidth magnifier means, necessary when an available output bandwidth of said output signal of said Reference DDS means is lower than that required by said input clock signal of said DDS Divider means according to a frequency plan of said $DDS^2$ synthesizer for, receiving said filtered output signal from said input Falter means, enlarging a bandwidth of said filtered output signal to the bandwidth required by said input clock signal of said DDS Divider means, filtering all unwanted products of the bandwidth enlargement process and providing a filtered, enlarged bandwidth output signal to said frequency translator means.

3. The DDS driven DDS frequency synthesizer according to claim 2, wherein said frequency translator means disposed between said bandwidth expander means and said reshaping means comprises:

a) frequency upconversion means for, frequency upconversion of said filtered, enlarged bandwidth output signal received from said bandwidth expander means to an output signal of upconverted frequency range required by said input clock signal of said DDS Divider means according to said frequency plan of said $DDS^2$ synthesizer:

b) output falter means for, receiving said output signal of upconverted frequency range from said frequency upconversion means, removing all unwanted upconversion products from said output signal of upconverted frequency range and supplying an output signal of required frequency range and bandwidth to said input clock signal of said DDS Divider means.

4. The DDS driven DDS frequency synthesizer according to claim 1, wherein said reshaping means disposed between said frequency translator means and said DDS Divider means comprises:

a) means to adjust amplitude, DC offset, rise & fall times and duty cycle of said output signal of required frequency range and bandwidth received from said frequency translator means and to provide an output signal of the form required by said input clock signal of said DDS Divider means.

5. The DDS driven DDS frequency synthesizer according to claim 1, wherein said DDS Divider means is working as a "sinewave divider" generating said sinewave output signal of digitally programmed frequency being a ratio of said input clock signal of digitally programmable frequency to a division factor "n" programmed by said division ratio control word, wherein the set of division factors "n" is limited to integer numbers 3, 4, 5, 6 etc., satisfying the inequality: $2<n<2^M$ where M is the effective length of said DDS Divider means look-up-table, and where said division factors are chosen to avoid generation of Phase Modulation (PM) spurious components due to the phase truncation and to limit generation of Amplitude Modulation (AM) spurious components to harmonics or sub-harmonics of said DDS Divider means, said sinewave output signal of digitally programmed frequency, wherein said input clock signal of programmable frequency of said DDS Divider means is generated by said Reference DDS means, then bandwidth expanded by said bandwidth expander means and then frequency translated by said frequency translator means and then refined by said reshaping means.

6. The DDS driven DDS frequency synthesizer according to claim 1, wherein said Trigger Timing Unit means to enable the programming process of said $DDS^2$ synthesizer subassemblies includes:

a) means to enable said programming process of said Reference DDS means by said reference frequency control word and of said DDS Divider means by said division ratio control word in properly established time intervals in order to minimize said $DDS^2$ synthesizer switching time.

* * * * *